US008810792B2

(12) United States Patent
Dane et al.

(10) Patent No.: US 8,810,792 B2
(45) Date of Patent: Aug. 19, 2014

(54) POLARIZATION COMPENSATED BEAM SPLITTER AND DIAGNOSTIC SYSTEM FOR HIGH POWER LASER SYSTEMS

(75) Inventors: C. Brent Dane, Livermore, CA (US); Edward W. H. Lao, San Francisco, CA (US); Scott N. Fochs, Livermore, CA (US)

(73) Assignee: Metal Improvement Company, LLC, Paramus, NJ (US)

( * ) Notice: Subject to any disclaimer, the term of this patent is extended or adjusted under 35 U.S.C. 154(b) by 752 days.

(21) Appl. No.: 13/038,555

(22) Filed: Mar. 2, 2011

(65) Prior Publication Data

US 2011/0255088 A1 Oct. 20, 2011

Related U.S. Application Data

(60) Provisional application No. 61/342,578, filed on Apr. 16, 2010.

(51) Int. Cl.
*G01J 4/00* (2006.01)
*G01J 1/22* (2006.01)
*G01J 1/04* (2006.01)

(52) U.S. Cl.
CPC ..... *G01J 1/22* (2013.01); *G01J 1/04* (2013.01)
USPC .......................................................... 356/370

(58) Field of Classification Search
None
See application file for complete search history.

(56) References Cited

U.S. PATENT DOCUMENTS 3,586,424 A * 6/1971 Schenk et al. ................ 351/213
3,724,930 A 4/1973 Farmer
4,174,154 A 11/1979 Kawasaki
4,191,928 A 3/1980 Emmett
4,208,129 A * 6/1980 Spencer ........................ 356/425
4,401,477 A 8/1983 Clauer et al.
4,426,155 A * 1/1984 Monchalin .................... 356/452
4,539,462 A 9/1985 Plankenhorn
4,621,924 A 11/1986 Williams
4,623,229 A 11/1986 Galan (Continued)

FOREIGN PATENT DOCUMENTS

EP 875743 B1 * 9/2001
JP 7246483 A 9/1995
WO 2008021134 A1 2/2008

OTHER PUBLICATIONS

ISR mailed Oct. 25, 2011 in PCT/US2011/026954.

(Continued)

*Primary Examiner* — Gregory J Toatley, Jr.
*Assistant Examiner* — Juan D Valentin, II
(74) *Attorney, Agent, or Firm* — Mark A. Haynes; Haynes Beffel & Wolfeld LLP

(57) ABSTRACT

A beam sampling system, includes a first beam splitter adapted to split a laser beam having a primary polarization component and a secondary polarization component, into a first intermediate sample beam, and a first beam splitter output beam, the intermediate sample beam including first percentage of the primary polarization component and a second percentage of the secondary polarization component. A 90-degree polarization rotator is positioned in the intermediate sample beam line. A second beam splitter is mounted so that the intermediate sample beam is split into an output sample beam on an output sample beam line, and a second transmitted beam, the output sample beam including substantially said first percentage of the secondary polarization component and substantially said second percentage of the primary polarization component.

34 Claims, 9 Drawing Sheets

424
430
405
425
403
423
422
435
404
401
421
402
412
7.5°
Polarization rotator
420
High energy laser beam

(56) References Cited

U.S. PATENT DOCUMENTS

| | | | | |
|---|---|---|---|---|
| 4,632,553 | A * | 12/1986 | Vidrine et al. | 356/451 |
| 4,656,433 | A | 4/1987 | Franklin et al. | |
| 4,698,479 | A | 10/1987 | Rando et al. | |
| 4,707,836 | A | 11/1987 | Travis | |
| 4,794,222 | A | 12/1988 | Funayama et al. | |
| 4,937,421 | A | 6/1990 | Ortiz, Jr. et al. | |
| 5,022,033 | A | 6/1991 | Hackell | |
| 5,075,893 | A | 12/1991 | Epstein et al. | |
| 5,118,918 | A | 6/1992 | Serrano | |
| 5,127,019 | A * | 6/1992 | Epstein et al. | 372/108 |
| 5,131,957 | A | 7/1992 | Epstein et al. | |
| 5,132,887 | A | 7/1992 | Torii et al. | |
| 5,142,118 | A | 8/1992 | Schlatter | |
| 5,239,408 | A | 8/1993 | Hackel et al. | |
| 5,329,350 | A * | 7/1994 | Wright et al. | 356/218 |
| 5,332,881 | A | 7/1994 | Topkaya et al. | |
| 5,384,803 | A | 1/1995 | Lai | |
| 5,449,879 | A | 9/1995 | Lawson et al. | |
| 5,525,429 | A | 6/1996 | Mannava et al. | |
| 5,569,018 | A | 10/1996 | Mannava et al. | |
| 5,571,575 | A | 11/1996 | Takayanagi | |
| 5,670,069 | A | 9/1997 | Nakai et al. | |
| 5,674,328 | A | 10/1997 | Mannava et al. | |
| 5,674,329 | A | 10/1997 | Mannava et al. | |
| 5,689,363 | A | 11/1997 | Dane et al. | |
| 5,741,559 | A | 4/1998 | Dulaney | |
| 5,986,234 | A | 11/1999 | Matthews et al. | |
| 5,986,236 | A | 11/1999 | Gainand et al. | |
| 6,072,149 | A | 6/2000 | Maruyama et al. | |
| 6,127,649 | A | 10/2000 | Toller et al. | |
| 6,178,002 | B1 * | 1/2001 | Mueller-Wirts | 356/491 |
| 6,198,069 | B1 | 3/2001 | Hackel et al. | |
| 6,215,097 | B1 | 4/2001 | Mannava | |
| 6,259,055 | B1 | 7/2001 | Sokol et al. | |
| 6,288,358 | B1 | 9/2001 | Dulaney et al. | |
| 6,384,371 | B1 | 5/2002 | Hinei et al. | |
| 6,410,884 | B1 | 6/2002 | Hackel et al. | |
| 6,462,301 | B1 | 10/2002 | Scott et al. | |
| 6,528,763 | B1 | 3/2003 | Lahram et al. | |
| 6,552,800 | B1 * | 4/2003 | Wright et al. | 356/497 |
| 6,611,383 | B1 * | 8/2003 | Lee | 359/629 |
| 6,657,160 | B2 | 12/2003 | Hackel et al. | |
| 6,671,046 | B2 * | 12/2003 | Mueller | 356/364 |
| 6,747,241 | B2 | 6/2004 | Shikoda et al. | |
| 6,867,390 | B2 | 3/2005 | Clauer et al. | |
| 7,095,497 | B2 * | 8/2006 | Kishikawa et al. | 356/364 |
| 7,109,436 | B2 | 9/2006 | Even et al. | |
| 7,718,921 | B2 | 5/2010 | Dane et al. | |
| 2002/0096503 | A1 | 7/2002 | Hackel et al. | |
| 2003/0217997 | A1 | 11/2003 | Clauer et al. | |
| 2005/0006361 | A1 | 1/2005 | Kobayashi et al. | |
| 2005/0045598 | A1 | 3/2005 | Even et al. | |
| 2006/0102602 | A1 | 5/2006 | Dane et al. | |
| 2006/0102604 | A1 | 5/2006 | Dane et al. | |

OTHER PUBLICATIONS

Park et al. Single Axial Mode Operation of a Q-Switched Nd:YAG Oscillator by Injection Seeding, IEEE Journal of Quantum Electronics 20(2) (Feb. 1984), 117-125.

Hanna, et al. Single longitudinal mode selection of high power actively Q-switched lasers, Opto-electronics 4, Jul. 5, 1972, pp. 249-256.

Crofts, G-J., et al., "Experimental and theoretical investigation of two-cell stimulated-Brillouin-scattering systems," J. Opt. Soc. Am. B, vol. 8, No. 11, Nov. 1991, 2282-2288.

Dane, C.B., et al., "Design and Operation of a 150 W Near Diffraction-Limited Laser Amplifier with SBS Wavefront Correction," IEEE Journal of Quantum Electronics 31(1) (Jan. 1995), 148-163.

Fairland, B.P., et al., "Laser shock-induced microstructural and mechanical property changes in 7075 aluminum," J. Appl. Phys., vol. 43, No. 9, Sep. 1972, 3893-3895.

Hanna, D.C., et al., "Single Axial Mode Operation of a Q-Switched Nd:YAG Oscillator by Injection Seeding," IEEE Journal of Quantum Electronics 20(2) (Feb. 1984), 117-125.

Park, Y.K., et al., "Electronic Linewidth Narrowing Method for Single Axial Mode Operation of Q-Switched Nd:YAG Lasers," Optics Communications 37(6) (Jun. 15, 1981), 411-416.

* cited by examiner

435
α
φ
β
C
θ3
ℓ
θ2
X
602
t
θ1
404
601
420

POLARIZATION COMPENSATED BEAM SPLITTER AND DIAGNOSTIC SYSTEM FOR HIGH POWER LASER SYSTEMS

The benefit of U.S. Provisional Application No. 61/342,578, filed 16 Apr. 2010, entitled DUAL GIMBAL OPTICAL SYSTEM MOVING BEAM SYSTEM is hereby claimed.

BACKGROUND OF THE INVENTION

1. Field of the Invention

The present invention relates to beam splitters and diagnostic systems for high energy laser systems.

2. Description of Related Art

There is generally a need to monitor beam characteristics such as pulse energy, pulse duration, and beam profile for applications using high energy laser systems. This can be done by taking a weak sample of the beam using a beam splitter or by monitoring the low level transmission of a high-reflectivity mirror coating. Optical coatings for a beam splitter can be designed to reflect only a small percentage of the high energy beam or, for a mirror, to transmit only a small percentage. Both of these approaches can be problematic, however, if a very stable, calibrated sample is required for the purpose of monitoring the energy or power in the main beam. The exact reflectivity of high damage threshold dielectric optical coatings can often be a function of environmental conditions such as temperature and humidity and can be very angle sensitive. For example, a high-quality mirror coating might have a reflectivity of 99.5%. If, due to environmental conditions, damage, or even heating from the high power laser beam, the reflectivity drops to 99.4%, it would still be a very good mirror. However, if the optical control system relies on the 0.5% transmitted beam to determine the energy in the main beam, then this 0.1% change will cause an unacceptably large 20% calibration error. A similar argument can be made against the use of a weak reflected beam from an anti-reflective (A/R) coating.

In order to avoid the pitfalls of calibrated transmission or reflection from optical coatings, the laser and beam delivery systems often use only uncoated optical surfaces to sample the high power beam. The reflectivity from these surfaces is determined by the index of refraction of the optical substrate (glass) at the laser wavelength, the angle of incidence, and the beam polarization. The first two parameters are easily controlled in many laser system designs. In some systems, the polarization of the laser beam can be quite stable. However, even small changes in polarization can have a large impact on the amount of power split out of the main beam in these systems.

FIG. 1 shows a prior art beam splitter using a fused-silica optical wedge 351 oriented with an incidence angle of 45 degrees with a P-polarized beam (E-field vector lies in plane of incidence). For optical wedge 351, the P-polarized reflectivity is only 0.6% from each surface of the wedge (called Fresnel reflectivity) for a total transmission of the P-polarized component of 98.8%. Typically, the optical wedge 351 is fabricated with a 0.5 to 1.0 degree optical wedge which allows the beam from the front and rear optical surfaces to be spatially separated and prevents optical interference effects which can change the sampling ratio. The first surface reflection on line 355 is used for calibrated energy measurements. The second surface of the optical wedge 351 sometimes receives an anti-reflection coating to reduce the overall insertion loss to the main beam although typical A/R coatings often have reflectivities that are not much below the 0.6% of the uncoated surface for this case. A reflected component that is 0.6% of a 15-20 J pulse from a laser system used for example in laser peening, is still too energetic for a typical pyroelectric energy meter so the first optical wedge 351 is usually followed by a second optical wedge 352 to further attenuate the sampled beam, as shown in FIG. 1.

While this uncoated beam splitter method of FIG. 1 works for laser systems having well-polarized outputs, it does not work well when installed as an energy measurement system on systems involving the use of beam delivery optics that can cause small shifts in polarization. When a laser beam reflects from a mirror with a dielectric optical coating, the polarization is completely unchanged as long as the direction of polarization is in pure S-polarization or P-polarization, i.e. E-field perpendicular (for S-polarization) or parallel (for P-polarization) to the plane of incidence. However, if the beam has a non-orthogonal polarization, small depolarization errors can result, slightly changing the beam polarization and degrading the polarization contrast. As an arbitrarily oriented beam reflects from the various mirrors between the output of the laser system and the target, these depolarization errors accumulate. Although the total error might not be sufficient to degrade performance for a particular laser application, it can cause significant changes in reflectivity for a beam splitter using a double wedge pair as shown in FIG. 1. For example, a 2× increase (i.e. doubling) in light levels after two beam wedge surface reflections would result from a depolarization state that only changes the surface reflectivity by 0.25%. This is an almost inconsequential change in energy and polarization (a few degrees rotation) delivered to the target surface but causes a 2× error in measured energy.

It is desirable to provide systems that overcome one or more of the problems outlined above, including a beam splitter and a diagnostic system for high power systems that are polarization independent.

SUMMARY OF THE INVENTION

A beam sampling system is described that includes a first beam splitter into a first intermediate sampled beam and a first beam splitter output beam. The intermediate sampled beam includes a first percentage of the primary polarization component of the laser beam, and a second percentage of the secondary polarization component. A 90-degree polarization rotator is positioned in the beam line of the intermediate sampled beam, or other means for rotating the beam is deployed, resulting in rotation of the intermediate sampled beam. A second beam splitter is mounted in relation to the intermediate sampled beam, so that the intermediate sampled beam is split into the output sample beam on an output sample beam line, and a second transmitted beam. The output sample beam will include substantially the first percentage of the secondary polarization component, and substantially the second percentage of the primary polarization component. As a result, the output sample beam will have a first component having a proportion of the primary polarization component of the input laser beam that is substantially equal to the product of the first and second percentages, and a second component having a proportion of the secondary polarization component of the input laser beam, that is also substantially equal to the product of the first and second percentages. A sensor in the beam line of the output sample beam senses a characteristic of the input beam with high fidelity which is not dependent on the polarization state of the incoming beam, because the beam sampling system compensates for polarization errors.

An embodiment of the first splitter is described which includes a first optical wedge having first and second faces, and in which the second face is inclined relative to the first face by a wedge angle. The first optical wedge is arranged so that the principal axis of the incident laser beam intersects the first face of an external angle of incidence and is split into a first intermediate sampled beam and a first internally transmitted beam. The first internally transmitted beam intersects the second face of the first optical wedge at an internal angle of incidence and is split into an internally reflected beam and the first beam splitter output beam. The wedge angle can be selected so that the internally reflected beam in the first optical wedge intersects the first face of the first optical wedge internally at an angle of incidence greater than or equal to an angle of total internal reflection for the first optical wedge, thereby capturing the internally reflected beam inside the first optical wedge and directing it away from other components in the system. A complementary embodiment of the second splitter is described which includes a second optical wedge, wherein a principal axis of the rotated intermediate sampled beam intersects the first face at the same external angle of incidence, and is split into the output sample beam and a second internally transmitted beam.

Embodiments are described where beam displacement, offset angle and reshaping of the input laser beam caused by the first beam splitter are corrected using a correcting means. In one example, the correcting means comprises a third optical wedge which is configured to match the first optical wedge, and mounted so that its first face is substantially parallel to the second face of the first optical wedge, and its second face is substantially parallel to the first face of the first optical wedge.

Also, embodiments of the beam sampling system are described that provide for compensating for variations in the output of the first and second beam splitters due to non-parallel rays in the laser beam, such as encountered for converging the laser beams and the like. In one example, the first beam splitter comprises first and second optical wedges, where the first optical wedge is arranged so that the principal axis of the beam line of the input laser beam intersects the first face at an external angle of incidence, and is split into a first reflected beam and a first internally transmitted beam. The second optical wedge is placed so that the principal axis of the first reflected beam intersects its first face at the same external angle of incidence, and is split into the first intermediate sampled beam and a second internally transmitted beam. As a result of this configuration of the first beam splitter, variations in first reflected beam due to variations in the angle of incidence on the first optical wedge due to non-parallel rays in the input beam are corrected by the second optical wedge. A complementary second beam splitter comprises third and fourth optical wedges. The third optical wedge is arranged so that the principal axis of the intermediate sampled beam intersects its first face at the same external angle of incidence and is split into a second reflected beam and an internally transmitted beam. The fourth optical wedge is arranged so that the principal axis of the second reflected beam intersects its first face at the same external angle of incidence and is split into the output sample beam and an internally transmitted beam. As a result of this configuration of the second beam splitter, variations in the second reflected beam due to variations in the angle of incidence on the third optical wedge due to non-parallel rays in the intermediate sampled beam are corrected by the fourth optical wedge.

A method for sampling a laser beam is described, where the laser beam is propagating on a beam line with the principal axis and has a primary polarization component and a secondary polarization component. A method includes splitting the laser beam into a first intermediate sampled beam on an intermediate sampled beam line, and a first beam splitter output beam. The intermediate sampled beam includes a first percentage of the primary polarization component and a second percentage of the secondary polarization component. Next, the method includes rotating the polarization of the intermediate sampled beam. Next, the method includes splitting the intermediate sampled beam into an output sample beam on an output sample beam line, and a second transmitted beam. The output sample beam includes substantially the first percentage of the secondary polarization component, and substantially the second percentage of the primary polarization component.

Embodiments of the method are described that include compensating for variations due to non-parallel rays in the laser beam, and compensating for variations due to non-parallel rays in the intermediate sampled beam.

Embodiments of the method are described that include correcting the laser beam on the first splitter output beam line for offset angle, displacement and beam reshaping caused by the first splitter.

Embodiments of the method are described that include sensing a characteristic of the output sample beam, such as energy or transverse spatial profile.

Also, embodiments of the beam splitter are described herein, both with and without the second optical wedge and polarization rotator, which include means for canceling the offset angle, beam displacement and beam reshaping induced by the first optical wedge on the deflected beam line. An embodiment of such means includes a third optical wedge having first and second faces, and in which the second face is inclined relative to the first by the wedge angle. The third optical wedge is mounted in relation to the first optical wedge, so that its first face is parallel to the second face of the first optical wedge, and its second face is parallel to the first face of the first optical wedge. Also, the first face of the third optical wedge is spaced away from the second face of the first optical wedge by distance sufficient to cause the output of the beam line emerging from the third optical wedge to be aligned with the input beam line at the first face of the first optical wedge.

In other embodiments of the diagnostic system, additional sensors are included, including a sensor such as an imaging sensor positioned in a beam line of a component of the laser beam which is reflected from the first face of the third optical wedge. For a laser system which includes a working beam primarily polarized in the P or S planes, and a polarized tracer beam primarily polarized in the opposite plane and co-aligned with the high power primary beam, an imaging sensor positioned in the beam line reflected from the first face of the third optical wedge can be adapted for imaging the tracer beam.

Thus, technology is described for sensing power, imaging the transverse spatial profile, or sensing other characteristics, of polarized laser energy delivered to the optical system in a manner that utilizes polarization independent beam splitters.

Other aspects and advantages of the beam sampling system can be seen on review of the drawings, the detailed description and the claims, which follow.

DETAILED DESCRIPTION

A detailed description of embodiments of the present invention is provided with reference to the FIGS. 1-11.

High powered lasers having polarized outputs can be used across a wide range of production processes, including but not limited to laser coating removal, laser heat treating, and laser peening.

Figure 2:
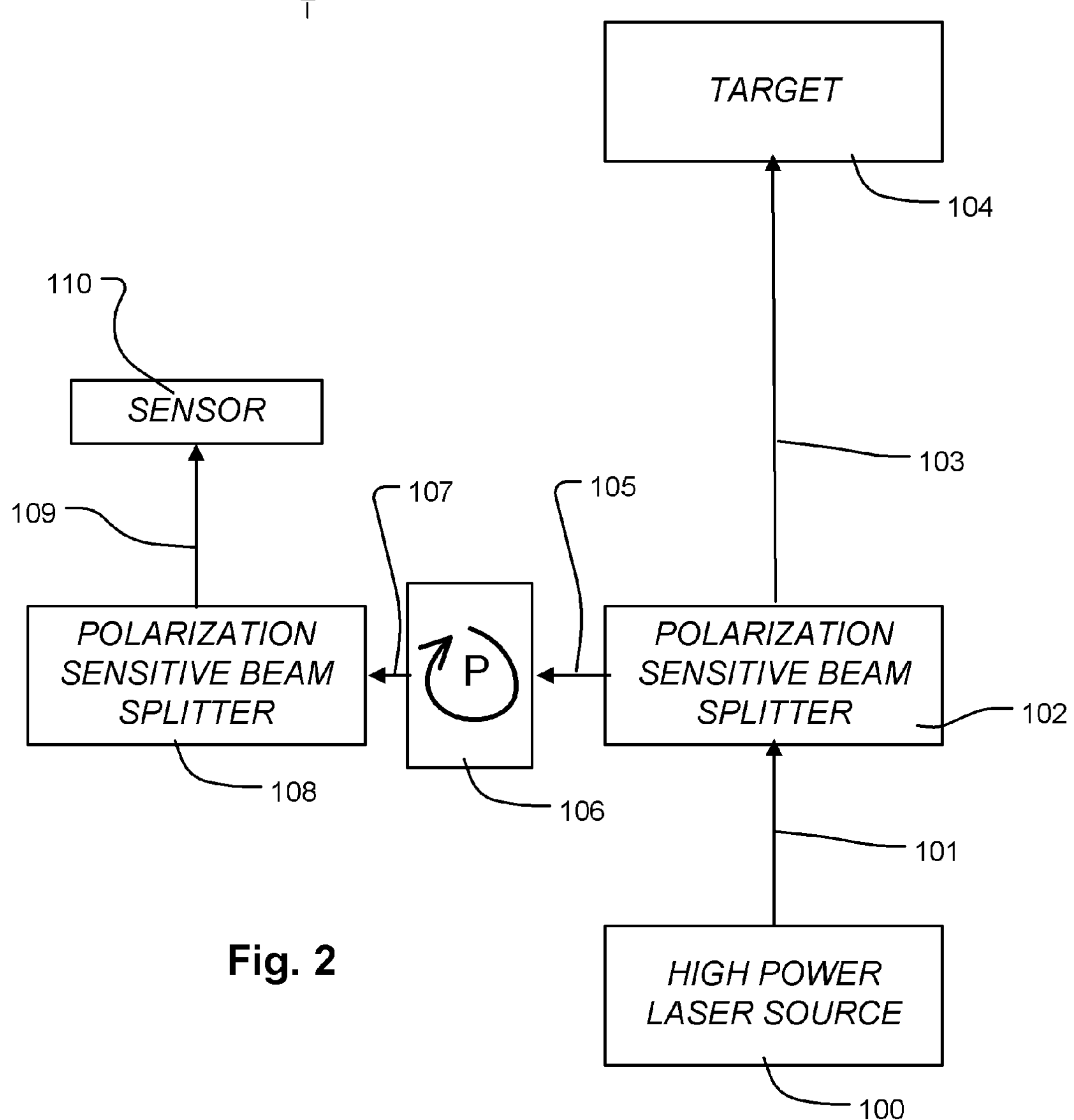
FIG. 2 is a block diagram of a polarization compensated beam splitter.

FIG. 2 is a block diagram of a beam sampling system for high powered lasers having polarized outputs, and in which polarization errors in the laser beam are corrected for in the sampling process. The beam sampling system is arranged in the beam line 101 of the high-power laser source 100. It includes a first polarization sensitive beam splitter 102 which splits the laser beam into a first intermediate sample beam 105 and a first beam splitter output beam 103. Because of the polarization sensitivity of the first beam splitter, the first intermediate sample beam 105 will include a first percentage of the primary polarization component of the input laser beam, and a second percentage of the secondary polarization component of the input laser beam. The magnitude of these primary polarization component and secondary polarization component will vary with polarization errors in the input beam.

The first beam splitter output beam 103 propagates toward a target 104, or other optical components in a beam delivery system. The first intermediate sample beam 105 propagates through a 90-degree polarization rotator 106, producing a rotated intermediate sample beam 107.

The rotated intermediate sample beam 107 is incident upon a second polarization sensitive beam splitter 108 which splits the rotated intermediate sample beam 107 into an output sample beam 109 and a second transmitted beam (not shown). The second beam splitter 108 is configured so that it has a polarization sensitivity that is complementary to that of the first beam splitter. Thus, the output sample beam 109 includes the second percentage of the rotated primary polarization component, and the first percentage of the rotated secondary polarization component. As a result, the output sample beam 109 includes a product of the first and second percentages of the primary polarization component of the input beam, and a product of the first and second percentages of the secondary polarization component of the input beam.

The output sample beam 109 is directed to a sensor 110, which produces a sensor output indicating a characteristic of the input beam on line 101, with high fidelity.

Figure 3:
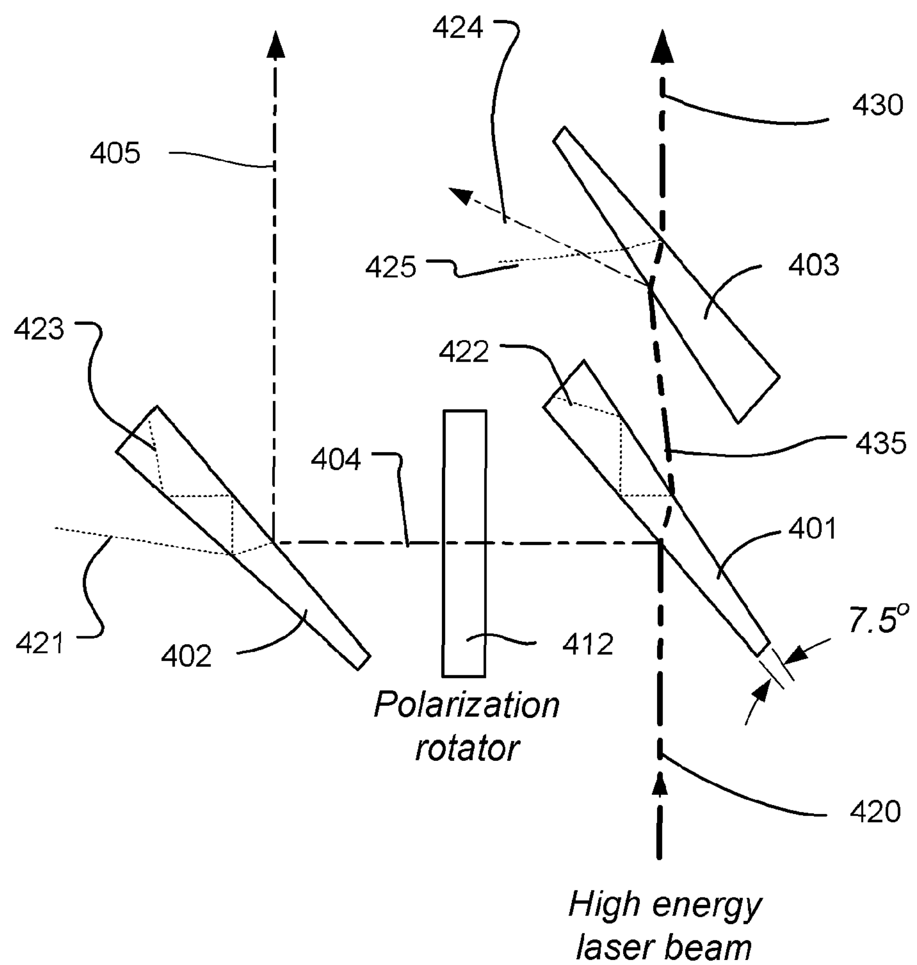
FIG. 3 illustrates an embodiment of a polarization compensated beam sampler.
Figure 5:
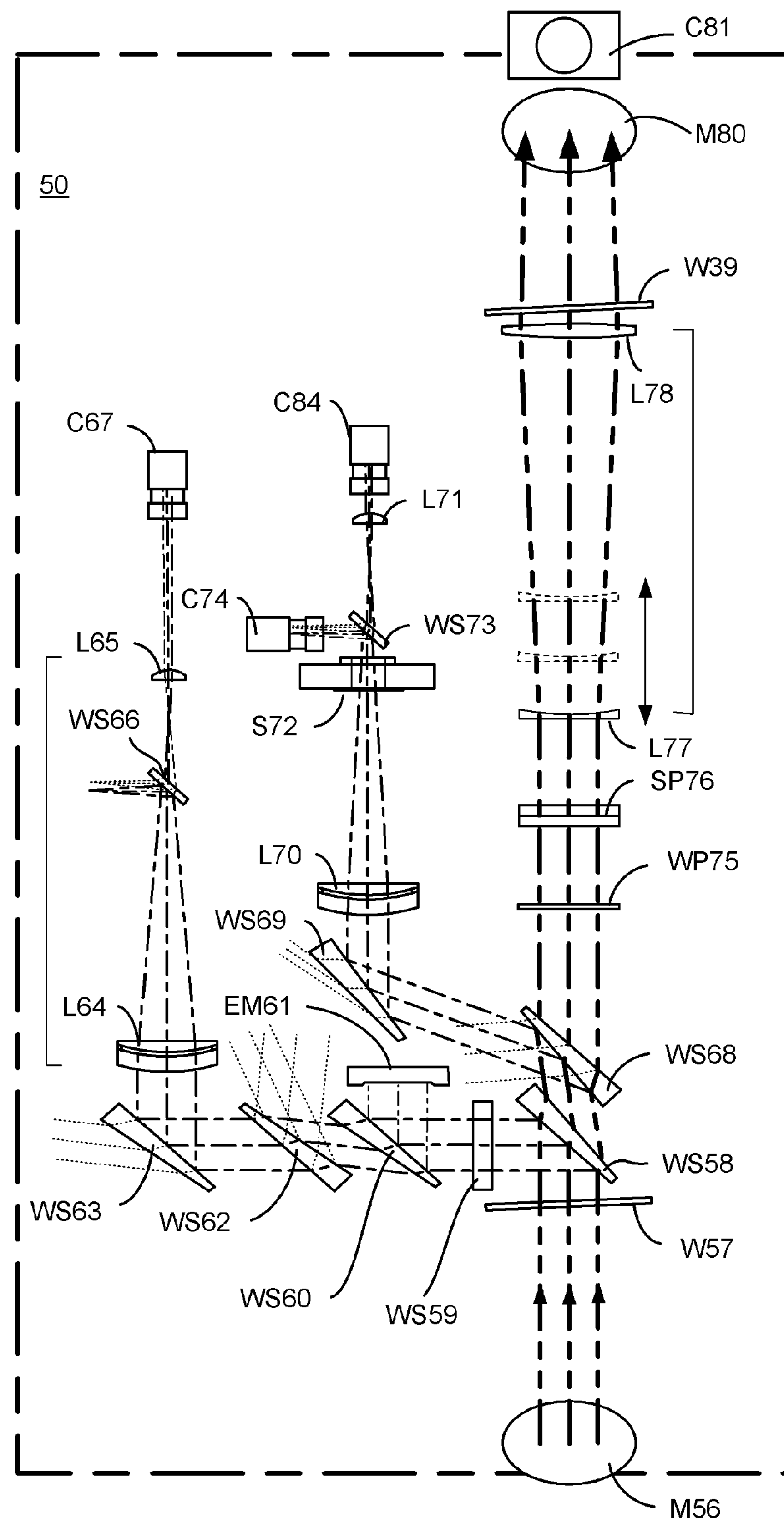
FIG. 5 is a diagram of an optical assembly for conditioning a high power laser system for delivery to a target, including a polarization compensated diagnostic system and power sensor.

A beam sampling system that is insensitive to polarization errors is shown in FIG. 3, and implemented in the optical system shown in FIG. 5. In the configuration of FIG. 3, two polarization sensitive beam splitters, embodied by respective uncoated optical plates or wedges 401, 402, are arranged with a 90 degree rotator 412 placed in between. As a result, the split-off beam on path 405 becomes completely insensitive to polarization errors.

In the example shown in FIG. 3, the optical wedge 401 is placed in the path 420 of a high-energy laser beam. The optical wedge 401 can comprise an uncoated optical wedge of fused silica or borosilicate glass, for example, in systems in which the laser energy has a wavelength in a range substantially transmitted by such material. The wedges 401, 402 are uncoated to accommodate high powers, for ease of design, and to prevent environmentally-induced variations in surface reflectivity. Alternative materials can be chosen according to the wavelength of operation and other parameters. For example, materials that can be used include for example, high index glasses such as flint glass (to reduce wedge angle), zinc selenide (mid-IR lasers), germanium (far-IR lasers), or magnesium fluoride (UV lasers).

A sample of the beam is reflected off the input surface of the optical wedge 401 on a first beam splitter beam line 404. The sample on the first beam splitter beam line 404 will include components that comprise respective percentages of the two orthogonal polarization states (i.e. P-polarization and S-polarization) of the laser energy on path 420, the relative magnitudes of which depend on the input polarization of the input beam on path 420. A rotator 412, such as a quartz rotator, rotates the polarization of both components of the sample on path 404 by a constant angle (90 degrees in this case), regardless of the polarization state of the sample. The polarization rotator can comprise a quartz plate having a thickness determined to cause 90 degrees of rotation for example at the wavelength of interest, in systems in which the laser energy is in a range substantially transmitted by such material. Alternative materials can be chosen according to the wavelength of operation and other parameters. For example, materials that can be used include potassium dihydrogen phosphate (KDP) or terbium-doped glass or crystals in an applied magnetic field.

Also, other active or passive polarization rotation technologies can be used, including for example geometrical beam rotation accomplished by orienting the reflections from beam splitter 102 and beam splitter 108 so that any two of beam paths 101, 105, and 109 are perpendicular. This would result in beam paths 109 (FIG. 2) and 405 (FIG. 3) propagating perpendicular to the page; no additional element for polarization rotation would be required in this case. Accordingly, a means for rotating polarization of the intermediate sample beam can be implemented using a separate rotator 106, or be implemented by using the arrangement of the splitters as mentioned above.

After rotation, a sample of the first sample from beam line 404 is reflected off the input surface of splitter optical wedge 402 on second beam splitter beam line 405. The beam splitter optical wedge 402 can be the same as the optical wedge 401, comprising an uncoated optical wedge of fused silica or borosilicate glass, for example, in systems in which the laser energy has a wavelength in a range substantially transmitted by such material. Alternative materials can be chosen according to the wavelength of operation and other parameters. In some embodiments, the second optical wedge 402 can comprise a different material than the first optical wedge 401, with appropriate adjustments in arrangement of the components that may arise because of differences in the index of refraction, or other optical properties. For example, materials that can be used include high index glasses such as flint glass (to reduce wedge angle), zinc selenide (mid-IR lasers), germanium (far-IR lasers), or magnesium fluoride (UV lasers).

The two beam splitter optical wedges 401, 402 are arranged to have matching incident angles (e.g. 45 degrees) when they comprise matching materials, for the beams on input beam line 420 and first beam splitter beam line 404, respectively. However, this design will work over a range of angles of incidence, as long as the angles of incidence on each of the two beam splitters are equal. The polarization rotation and matched incident angles cause the reflectivity of the surfaces of the two beam splitters (wedges 401, 402) to be the product of the reflectivity of two orthogonal polarization states, which is constant. Depolarization errors of the laser energy on input beam line 420 will now have no effect on the percentage of the main beam's energy after two reflections delivered on second beam splitter beam line 405, resulting in a polarization-compensated, or preferably a polarization-independent, diagnostic beam.

Figure 4:
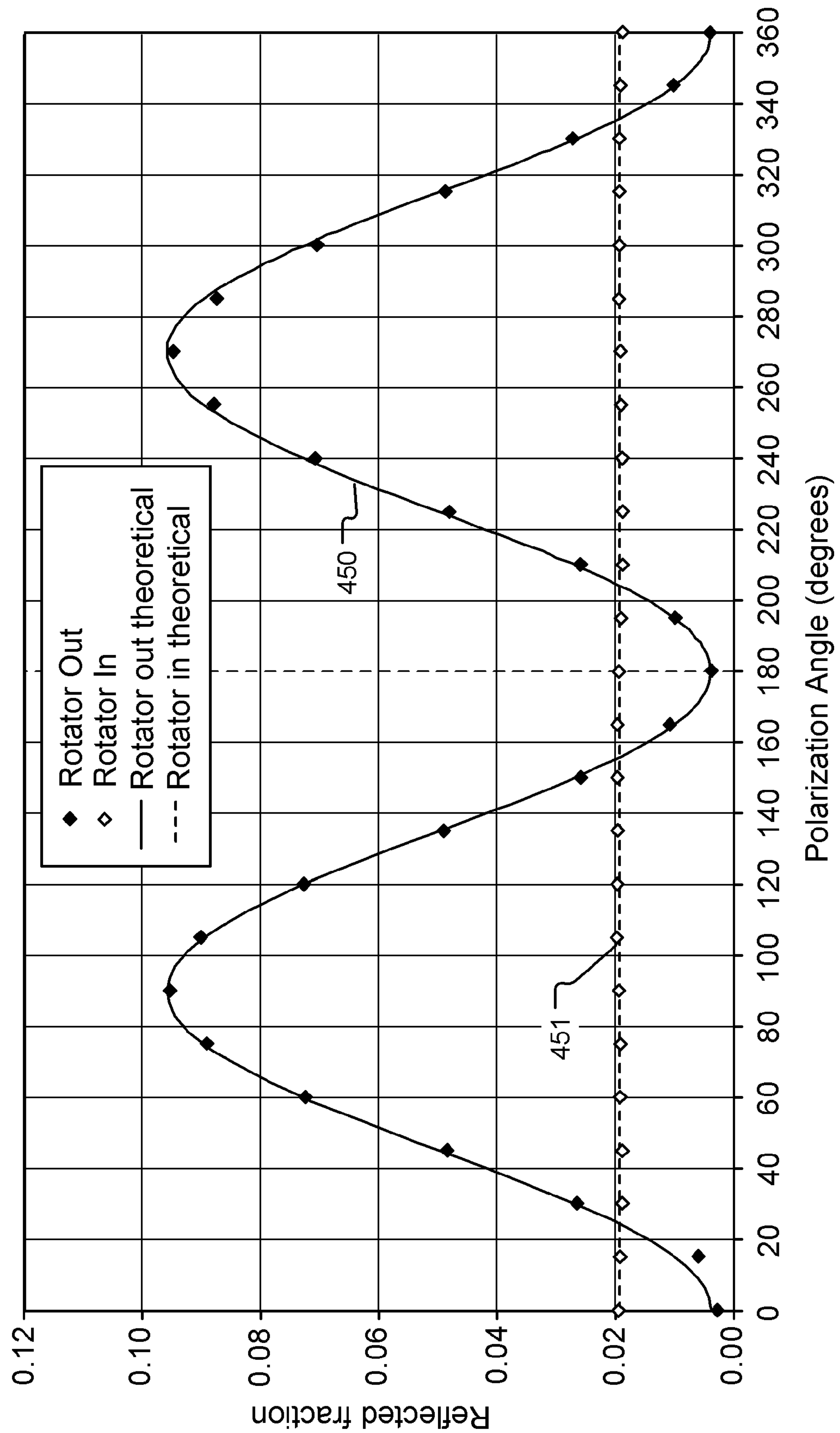
FIG. 4 is a graph of reflected fraction versus input polarization angle for a system like that of FIG. 3, with and without the polarization rotator.

FIG. 4 is a graph that demonstrates this polarization independence experimentally. A two beam wedge configuration was set up for these measurements. Instead of 45 degree angles of incidence, as shown in FIG. 3, angles of 72 degrees were chosen to accentuate the polarization-induced reflectivity errors. The trace 450 shows the points for the configuration without the polarization rotator, where the solid diamond points show measured values and the solid line shows the theoretical values of the reflected fraction over a complete 360 degree polarization scan, which fluctuates significantly. Note the strong dependence of the measured signal on input polarization. The trace 451 shows the point for the configuration after inserting the 90 degree quartz rotator between the splitters, where the opened diamond points show measured values and the dashed line shows the modeled values of the reflected fraction over a complete 360 degree polarization scan. Even for the very dramatic polarization changes of this demonstration, the sampled fraction as can be seen on trace 451 remains constant.

As pointed out in the previous beam splitter optical wedge discussion, there is a reflected beam generated from each of the two surfaces of the optical wedge and these need to be separated. As shown in FIG. 3, the majority of the laser energy on input beam line 420 is not reflected on the input surface of the splitter optical wedge 401, but rather is slightly diffracted through the wedge 401 and exits the output surface on a deflected beam line 435.

However, at the output surface of optical wedge 401, a portion of the beam is reflected on internally reflected beam line 422. For this application of a beam splitter, it is important that the portion of the beam reflected on the output surface be separated from the portion of the beam on beam line 404 which will be delivered to the diagnostic component. This separation is typically done in a beam splitter like that of FIG. 1 by introducing a wedge angle between the front and back surfaces of the plate so that the two beams can diverge from each other. This can be seen in FIG. 1 by the reference to a 0.5 degree wedge angle, and the slight divergence of the beam reflected from the output surface of the wedge 351 relative to that of the beam reflected on the input surface. The size of this optical wedge is normally kept small to minimize refractive re-pointing of the transmitted beam and to prevent a dimensional change in the beam in the plane of optical incidence. The two beams can be separated for the purposes of use by diagnostic equipment, by allowing them to propagate far enough for the angle between them to provide complete separation or by using a field-stop at the focus of an imaging telescope. Both of these approaches are difficult to apply to compact optical systems, or other applications of compact diagnostic equipment for laser systems. In space-limited environments, like the optical system shown in FIG. 4, the optical housing cannot provide sufficient space for divergence of the beams to the point that the undesired beam can be blocked. In systems in which the sample beam is used for diagnostic processes such as optical tracking, a field-stop to block the secondary beam can be used. However, where the diagnostic system includes, for example, a centering/pointing telescope, such a field stop would prevent detection of off-axis beams during optical tracking.

In the configuration shown in FIG. 3, to suppress the unwanted rear surface beam splitter reflections (referred to as ghosts), a large enough optical wedge angle is used in the embodiments described here, such that the beams on internally reflected beam line 422 reflected from the second surface of the beam splitter optical wedge 401 are trapped inside the optical element by total internal reflection. This requires that the internal optical incidence angle be greater than or equal to the critical angle for total internal reflection, which for a fused silica substrate and a laser wavelength of 1053 nanometers, is 43.6 degrees. As shown in FIG. 3, for a 45 degree angle of incidence on the external surface, this is readily achieved with a beam splitter optical wedge angle of 7.5 degrees.

In the embodiment illustrated, the second beam splitter optical wedge 402 is similar to the first beam splitter optical wedge 401, and the portion of the beam from first beam splitter beam line 404 that is transmitted at the first surface of the splitter 402 intersects the second surface, resulting in an internal reflection that propagates inside the optical wedge 402 at an angle greater than or equal to the angle for total internal reflection on internal reflection beam line 423, diverging substantially from the reflected beam line 405. The internally reflected light on internal reflected beam line 422 in the first optical wedge and line 423 in the second optical wedge bounces through the interior of the splitter optical wedges 401, 402, and scatters out the optically rough ground edges of the substrate and is lost. Beams transmitted through the optical wedge 402 on line 421, and beams reflected from the first surface of the optical wedge 403 on line 425 can be blocked because of their large angles relative to the desired beam samples.

Figure 1:
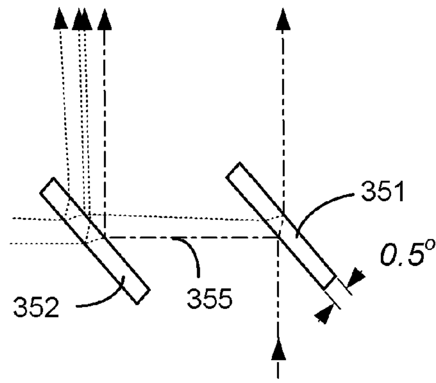
FIG. 1 illustrates a beam sampler arrangement, known in prior art systems.

As shown in FIG. 3, the number of sampled beams after two beam splitters is reduced from four beams reflected from the second beam splitter wedge 352 in the conventional case illustrated in FIG. 1, to a single, clean beam on line 405 using the optical wedges of FIG. 3.

As mentioned earlier, a beam splitter optical wedge, like the optical wedge 401 in FIG. 3, causes strong repointing of the transmitted beam, offset of the beam, and reshaping because one dimension of the beam is reduced (re-pointing by 7.5 degrees and width reduction of 23% for the illustrated case). However, this effect can be completely or substantially eliminated as shown in FIG. 3, by placing a third beam splitter optical wedge 403 in the deflected beam line 435, reversed in direction from the first. The laser energy on path 435 is refracted by the optical wedge 403 and exits on output beam line 430. This restores the original pointing direction so that the input beam line 420 and the output beam line 430 are parallel. Also, by placing splitter optical wedge 403 at the correct distance from the first beam splitter optical wedge 401, the beam offset can be canceled, resulting in beam lines 420 and 430 being aligned. The beam splitter optical wedge 403 can be the same as the optical wedge 401, comprising an uncoated optical wedge of fused silica or borosilicate glass, for example, in systems in which the laser energy is in a range substantially transmitted by such material. Alternative materials can be chosen according to the wavelength of operation and other parameters. In some embodiments, the second optical wedge 403 can comprise a different material than the first optical wedge 401, with appropriate adjustments in arrangement of the components that may arise because of differences in the index of refraction, or other optical properties. For example, materials that can be used include high index glasses such as flint glass (to reduce wedge angle), zinc selenide (mid-IR lasers), germanium (far-IR lasers), or magnesium fluoride (UV lasers). The embodiments of optical wedge 403 matching optical wedge 401 and comprising the same materials and spaced appropriately away from optical wedge 401, and embodiments of the optical wedge 403 that comprise different materials than optical wedge 401 and spaced appropriately away from optical wedge 401, can be used for canceling beam re-pointing, beam offset and beam reshaping caused by the first optical wedge.

Using the splitter technology described here, the high power beam on output beam line 430 is unchanged in direction, displacement, and width relative to the beam on input beam line 420. The total optical loss introduced by the four uncoated surfaces of the double fused silica wedges 401 and 403 for a wavelength on the order of 1.05 microns is only 1.8% for the primary polarization (P-polarization at the first face of wedge 401). Furthermore, the optical system of FIG. 4 uses the first surface of the compensating optical wedge 403 to direct a sample on a second sample line 424. This can be used for example to direct a sample of an S-polarized tracer beam for centering and pointing cameras C74, C84 as shown in FIG. 5.

FIG. 5 illustrates the basic configuration of a dual gimbal optical system (DGS) in which beam splitter technology as described here is deploying, including sensors for a diagnostic system relying on the samples produced using the beam splitter technology. In this system, a high energy laser beam is delivered to a mirror M56 on a receiver gimbal on the optical system which may be held by a processing robot. A closed loop control system uses a low power, continuous-wave (CW) tracer beam that is precisely co-aligned with the high energy pulsed beam to maintain accurate alignment through the optical system. As shown in FIG. 5, the DGS adds a second mirror M80 on a second gimbal on the output of the optical system, allowing the beam to be scanned across a treatment surface. Formatting optics contained in the optical system correct the beam divergence, beam shape, and polarization to achieve a uniform pattern of square spots across the work piece. Also contained in the DGS are diagnostic sensors used for beam alignment, and to measure the beam profile and the laser pulse energy.

The DGS of FIG. 5 is part of an optical system described in co-pending U.S. patent application Ser. No. 12/945,713, filed 12 Nov. 2010, (MICI 1011-2), which is incorporated by reference as if fully set forth herein. In such system and other laser systems, it is desirable for the input beam polarization to the DGS be polarized to minimize the optical losses from beam splitters WS58 and WS68 in FIG. 5.

FIG. 5 shows a schematic of the optical components and beam paths within the DGS as mounted on a support structure 50, which can be in turn mounted on a robot for precise orientation. Uncoated beam splitters WS58, WS60 and WS68 constitute an embodiment of the beam splitter technology described with reference to the optical wedges 401, 402 and 403 of FIG. 3. In a system like that of FIG. 5, all three splitters WS58, WS60 and WS68 can be substantially identical, and be for example about 4 inches long, with a thickness at the wide end of about 0.75 inches, and a thickness at the narrow end of about 0.22 inches. The optical wedges WS58 and WS68 can be spaced about 2.37 inches apart along the beam line.

An incoming laser beam reflects from the receiver gimbal mirror M56 shown at the bottom of the figure. A protective window W57 on the input and protective window W39 on the output of the DGS enclosure creates a sealed, clean environment for the optical components. The control system always maintains P-polarization for the incoming beam resulting in a 0.6% reflection from the first uncoated beam splitter WS58. The reflected beam is rotated to secondary polarization by a 90° quartz rotator WP59, causing 8% to reflect from the next beam splitter WS60 which is directed to a calibrated energy meter EM61, which can comprise a pyroelectric sensor or other type of energy or power sensor. The beam that transmits through the energy meter splitter WS60 is passed through another compensating splitter WS62, having an optical wedge which cancels the offset angle, beam displacement, and beam reshaping from the energy meter beam splitter WS60. The beam is then reflected by another beam splitter WS63 into a diagnostic telescope, including lens L64 and lens L65, with beam splitter WS66 in between. The diagnostic telescope directs an image of the beam from an image plane approximately at the output aperture of the laser system, to beam profile camera C67, which records a beam profile.

After passing through the high energy beam splitter WS58, the main beam then hits the tracer beam splitter WS68. This splitter WS68 has an optical wedge which cancels the offset angle, beam displacement, and beam reshaping from the high energy beam splitter WS58. The first surface of the tracer beam splitter WS68 reflects <0.3% of the high energy pulsed beam but reflects 16% of the tracer beam which is S-polarized. The sampled beam is directed by another beam splitter WS69 into a diagnostic telescope including lenses L70 and L71 with beam splitter WS73, and which is equipped with two cameras: (1) tracer beam pointing camera C74 in the path of the beam reflected at beam splitter WS73, and (2) tracer beam centering camera C84 at the focus of the output lens L71. The centering camera C84 records an image of the tracer beam on the surface of the receiver gimbal mirror M56 and the pointing camera measures the pointing direction of the beam by looking at the image at the focus of the telescope input lens L70 (the far field). The information from these two cameras C74 and C84 is used to maintain beam alignment through the optical system by the active control of the transmitter and receiver gimbals. A high speed shutter S72 built into this telescope is used to protect the cameras during each high energy laser pulse.

After the tracer beam splitter WS68, the high energy beam passes through a precision controlled λ/2 wave plate WP75 which is used to rotate the P-polarized beam to whatever polarization is needed to provide optimal effectiveness for the surface of the work piece. The next component, the Stokes lens pair SP76, is made up of two cylindrical lenses of equal and opposite power. When the curved surfaces of the cylinders are rotationally aligned, they cancel, causing no change in the transmitted beam. However, when one lens is rotated relative to the other, the beam diverges in one axis and converges on the other. Both lenses can be rotated as a pair to orient this anamorphic power in an arbitrary direction with respect to the outgoing beam, allowing the aspect ratio of the beam to be corrected on the surface of the work piece.

The last lenses in the DGS are negative and positive lenses, L77 and L78, which form a zoom telescope. The negative lens L77 can be translated along the optical propagation axis in order to vary the spacing between the lenses. This changes the divergence angle of the beam exiting the optical system effectively changing the spot size on target. The final active component in the DGS is the raster gimbal mirror M80, which scans the output beam across the surface of the component being laser peened. Finally, a calibration camera C81 is mounted on the assembly, and arranged to provide an image of the work piece at the location of the tracer beam, or working beam. Calibration camera C81 has its own pan/tilt mount and zoom/focus controls and is arranged to provide an image of the work piece at the location of the tracer beam, or working beam in the near infrared.

The optical components illustrated in FIG. 5 are mounted in an assembly, which can be referred to as a dual gimbal optical system (DGS), which includes beam scanning and beam formatting capability incorporating actively adjustable optics.

As shown in FIG. 5, the ghost-free beam splitters are used to collect the beam sample from the primary high energy beam, to direct a second sample to the calibrated energy meter, and to reflect beams into each of the diagnostic imaging telescopes. In combination therefore, a polarization independent energy meter is provided. Also, a polarization independent diagnostic system is provided. In other laser systems, diagnostic sensors other than cameras or energy meters can be deployed, including for example a photodiode temporal monitor, a Shack-Hartmann wavefront sensor, spectrometer, an auto-correlator, or a diagnostic etalon.

Figure 6:
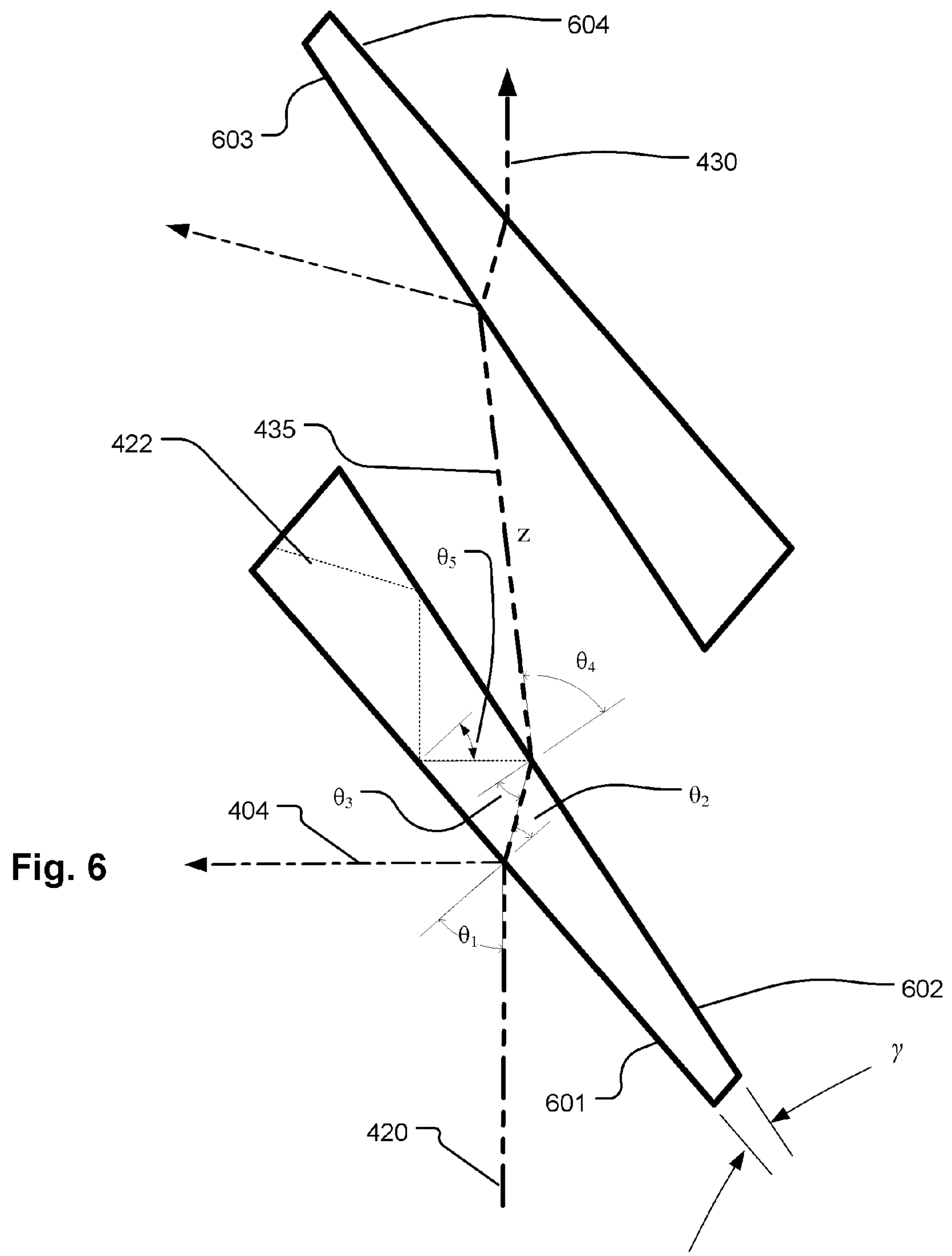
FIGS. 6 and 7 illustrate the geometry of embodiments of a polarization compensated beam sampler like that of FIG. 3.
Figure 7:
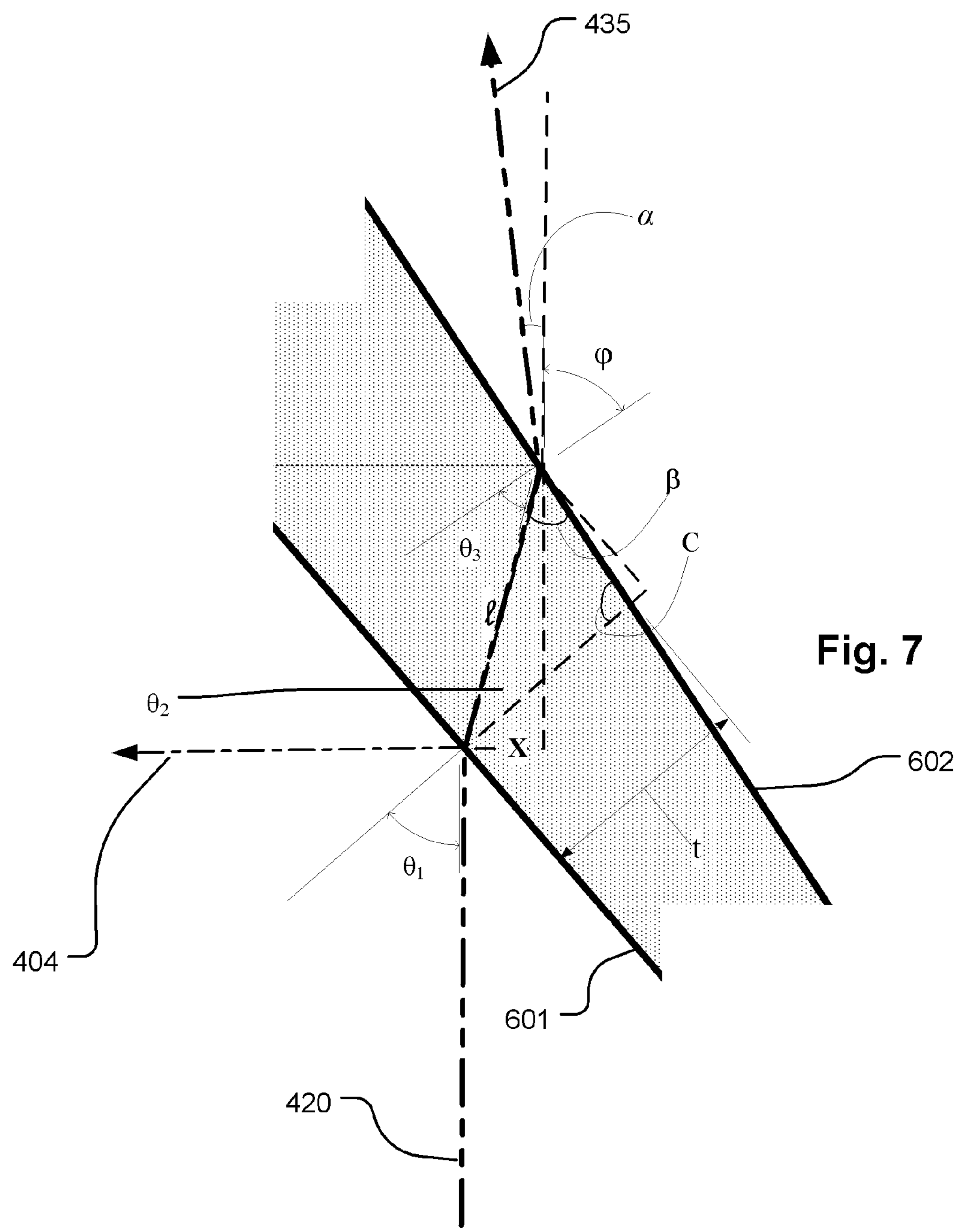

The geometry of the beam splitter optical wedges 401 and 403 shown in FIG. 3 can be understood with reference to FIGS. 6 and 7 (two figures are used to limit crowding). In FIG. 6, two optical wedges are shown that correspond with optical wedges 401 and 403 of FIG. 3. The first optical wedge has a first face 601 and a second face 602. the second optical wedge has a first face 603 and a second face 604. The first face 601 of the first optical wedge and the second face 604 of the second optical wedge are substantially parallel. Likewise, the second face 602 of the first optical wedge and the first face 603 of the second optical wedge are substantially parallel. FIG. 5 illustrates beam lines and angles of incidence and other parameters of the geometry, while FIG. 6 illustrates other angles and dimensions of the optical paths, that can be used to describe the geometry. Referring to FIGS. 6 and 7, variables are defined, and the geometry necessary for canceling the offset angle, beam displacement, and beam reshaping induced by the first beam splitter in the pair can be understood as follows:

$\gamma$=wedge angle $\alpha$=angular deviation from incoming beam line n=index of refraction of first optical wedge (index of refraction in air is 1)

$\theta_1$=Angle of incidence at first face of first optical wedge $\theta_2$=angle of refraction at first face of first optical wedge $\theta_3$=angle of incidence at second face of first optical wedge $\theta_4$=angle of refraction at second face of first optical wedge $\theta_5$=angle of incidence of internal reflected beam at first face of first optical wedge t=normal thickness of optical wedge along a normal to surface 601 at the point of incidence to the surface 602

X=lateral offset l=propagation distance in optical wedge.

The geometry can be understood as follows:

$$\theta_2 = \mathrm{Sin}^{-1}\left[\frac{1}{n}\cdot\sin\theta_1\right]$$

$$180 = 90 + \theta_2 + \beta + \gamma$$

-continued $$\beta = 90 - \theta_2 - \gamma$$

$$180 = \beta + \theta_2 + C$$

$$C = 180 - \beta - \theta_2$$

$$\frac{l}{\mathrm{Sin}C} = \frac{t}{\mathrm{Sin}\beta}$$

$$\frac{l}{\mathrm{Sin}(180 - (90 - \theta_2 - \gamma) - \theta_2)} = \frac{t}{\mathrm{Sin}(90 - \theta_2 - \gamma)}$$

$$\frac{l}{\mathrm{Cos}l} = \frac{t}{\mathrm{Cos}(\theta_2 + \gamma)}$$

$$l = \frac{t\cos\gamma}{\cos(\theta_2 + \gamma)}$$

$$\cos(90 - \theta_1 + \theta_2) = \frac{X}{l}$$

$$X = \frac{t\cos\gamma\cdot\sin(\theta_1 - \theta_2)}{\cos(\theta_2 + \gamma)}$$

$$\theta_3 = \theta_2 + \gamma$$

$$\theta_5 = \theta_2 + 2\gamma$$

$$n\sin\theta_3 = \sin\theta_4$$

$$n\sin(\theta_2 + \gamma) = \sin\theta_4$$

$$\theta_4 = \sin^{-1}[n\sin(\theta_2 + \gamma)]$$

$$\alpha = \theta_4 - \phi \rightarrow \phi = \theta_4 - \alpha$$

$$90 = \phi + 90 - \theta_1 - \gamma$$

$$\alpha = \theta_4 - \theta_1 - \gamma$$

$$\sin\alpha = \frac{2x}{z}$$

$$z = 2\frac{x}{\sin\alpha}$$

Note also that for the total internal reflection on internally reflected beam line 422, the optical wedge should be configured so that the following is true:

$$(\theta_2 + 2\gamma) > \sin^{-1}\left(\frac{1}{n}\right)$$

The beam sampling system described above works well with a collimated input beam. However, for non-collimated beams which include non-parallel rays, the sensitivity of the angle of incidence of the rays on the beam splitters can result in distortions of the sample beam. In high power laser systems, such as used in high energy laser peening, where the beam is converging toward a treatment surface, no direct measurement of the high power density (for example 10 GW/cm$^2$), high energy density (for example 300 J/cm$^2$) the laser spot is possible. The spot shape, size and quality had to be estimated from low energy burns on thermal paper, or by inferring a profile from the imaging characteristics of the beam delivery system. A sampling system is provided here which is capable of directing an accurate low-power sample of the laser peening beam onto a high-resolution image sensors, such as digital cameras, to record the transverse spatial profile at a plane equivalent to the surface of the work piece. Conventional attenuation components which would be needed to produce a low power sample, such as a neutral density filter, would be damaged by the full pulse energy of the laser peening beam. Also, it is desirable to sample the actual final converging beam on its way to the target, without the need for lenses or other re-imaging optics that could introduce uncertainty into the accuracy of the generated image.

Figure 8:
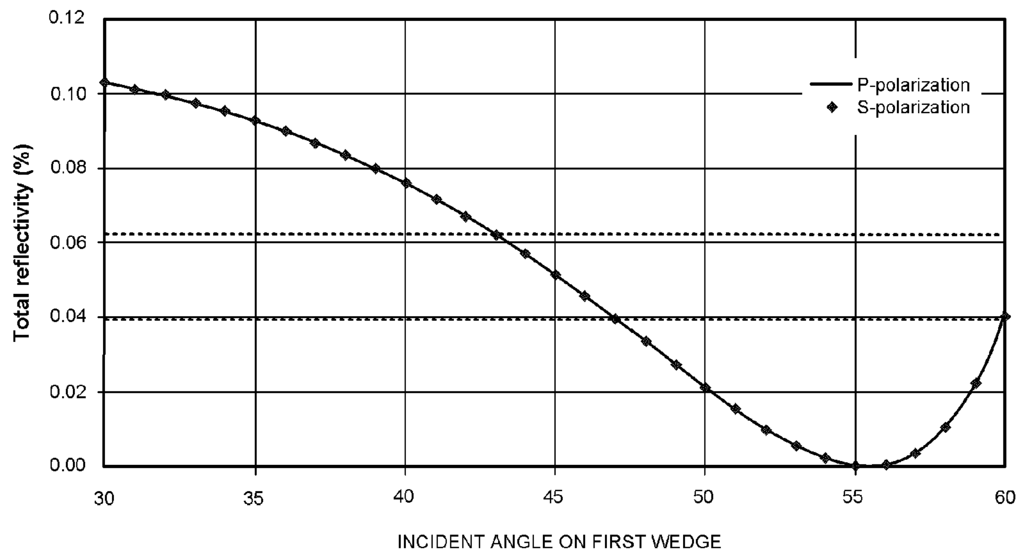
FIG. 8 is a graph total reflectivity of the sampler embodiment of FIG. 3 versus incidence angle.

The sensitivity of a beam sampling system like that described with reference to FIG. 3 to angle in incidence is shown in FIG. 8, which is a graph of total reflectivity percentage versus the incident angle on the first wedge for P-polarization and S-polarization of the input beam. As can be seen, the total reflectivity of the system is highly dependent on angle of incidence. For a converging beam with a focal ratio in the approximate range of f/15 to f/25, so that the maximum convergence angle is a less than 2°, the variation in reflectivity can be over 40%, as shown by the horizontal bar around the 45° incident angle. This is clearly not acceptable for many applications of the sampling technology.

Figure 9:
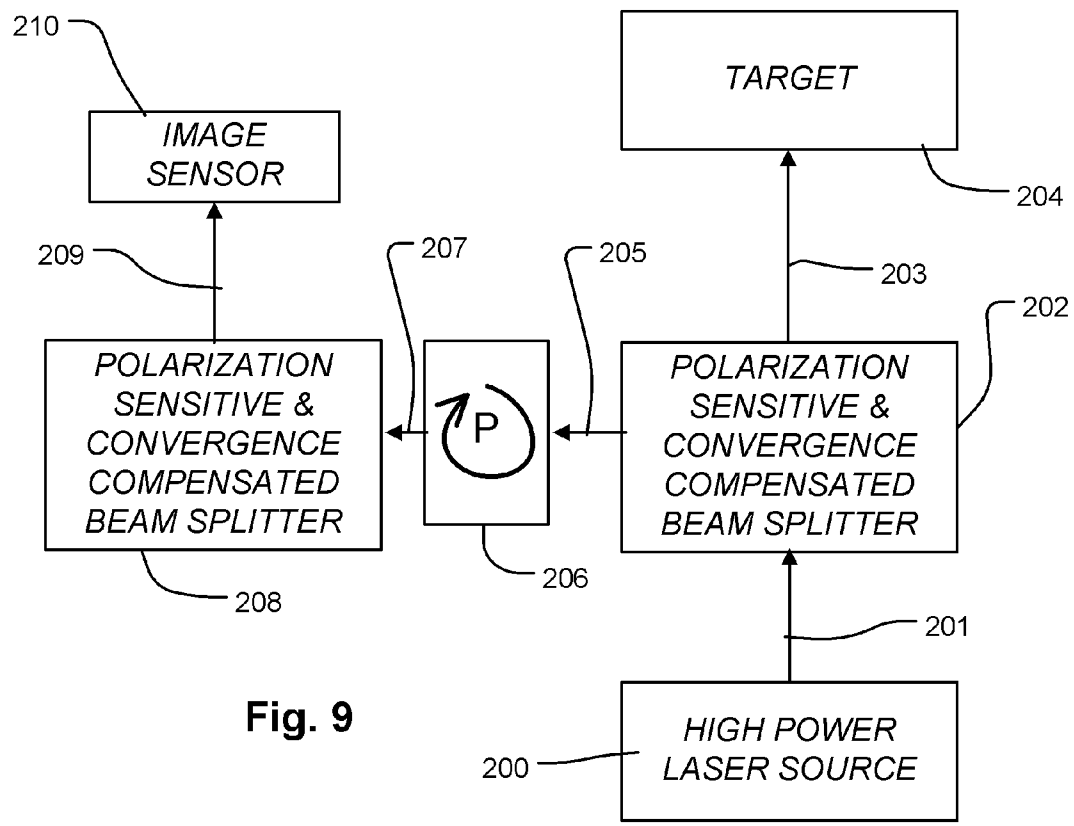
FIG. 9 is a block diagram of a polarization and divergence compensated beam splitter.

FIG. 9 is a block diagram of a beam sampling system for high powered lasers having polarized outputs and non-parallel rays, and in which small polarization errors and convergence in the laser beam are corrected for in the sampling process. The beam sampling system is arranged in the beam line 201 of the high-power laser source 200. It includes a first polarization sensitive and convergence compensated beam splitter 202 which splits the laser beam into a first intermediate sample beam 205 and a first beam splitter output beam 203. Because of the polarization sensitivity of the first beam splitter, the first intermediate sample beam 205 will include a first percentage of the primary polarization component of the input laser beam, and a second percentage of the secondary polarization component of the input laser beam. The magnitude of the primary polarization component and secondary polarization component will vary with polarization errors in the input beam. The first intermediate sample beam 205 will maintain the spatial profile of the input beam, even for non-parallel rays, due to compensation for variations in reflectivity due to variations in the incidence angles for the rays.

The first beam splitter output beam 203 propagates toward a target 204, or other optical components in a beam delivery system. The first intermediate sample beam 205 propagates through a 90-degree polarization rotator 206, producing a rotated intermediate sample beam 207.

The polarization-rotated intermediate sample beam 207 is incident upon a second polarization sensitive and convergence compensated beam splitter 208 which splits the rotated intermediate sample beam 207 into an output sample beam 209 and a second transmitted beam (not shown). The second beam splitter 208 is configured so that it has a polarization sensitivity that matches that of the first beam splitter 202. Thus, the output sample beam 209 includes the second percentage of the rotated primary polarization component, and the first percentage of the rotated secondary polarization component. As a result, the output sample beam 209 includes a product of the first and second percentages of the primary polarization component (e.g. P-polarization at the incident face of the first splitter 202) of the input beam, and a product of the first and second percentages of the secondary polarization component (e.g. S-polarization at the incident face of the first splitter 202) of the input beam. The output sample beam 209 will maintain the spatial profile of the rotated intermediate sample beam 207, even for non-parallel rays, due to compensation for variations in reflectivity due to variations in the incidence angles for the rays.

The output sample beam 209 is directed to a sensor 210, which produces a sensor output indicating a characteristic of the input beam on line 201, with high fidelity, because of the compensation for convergence of the beam and for polarization shifts in the beam in the beam splitters.

Figure 10:
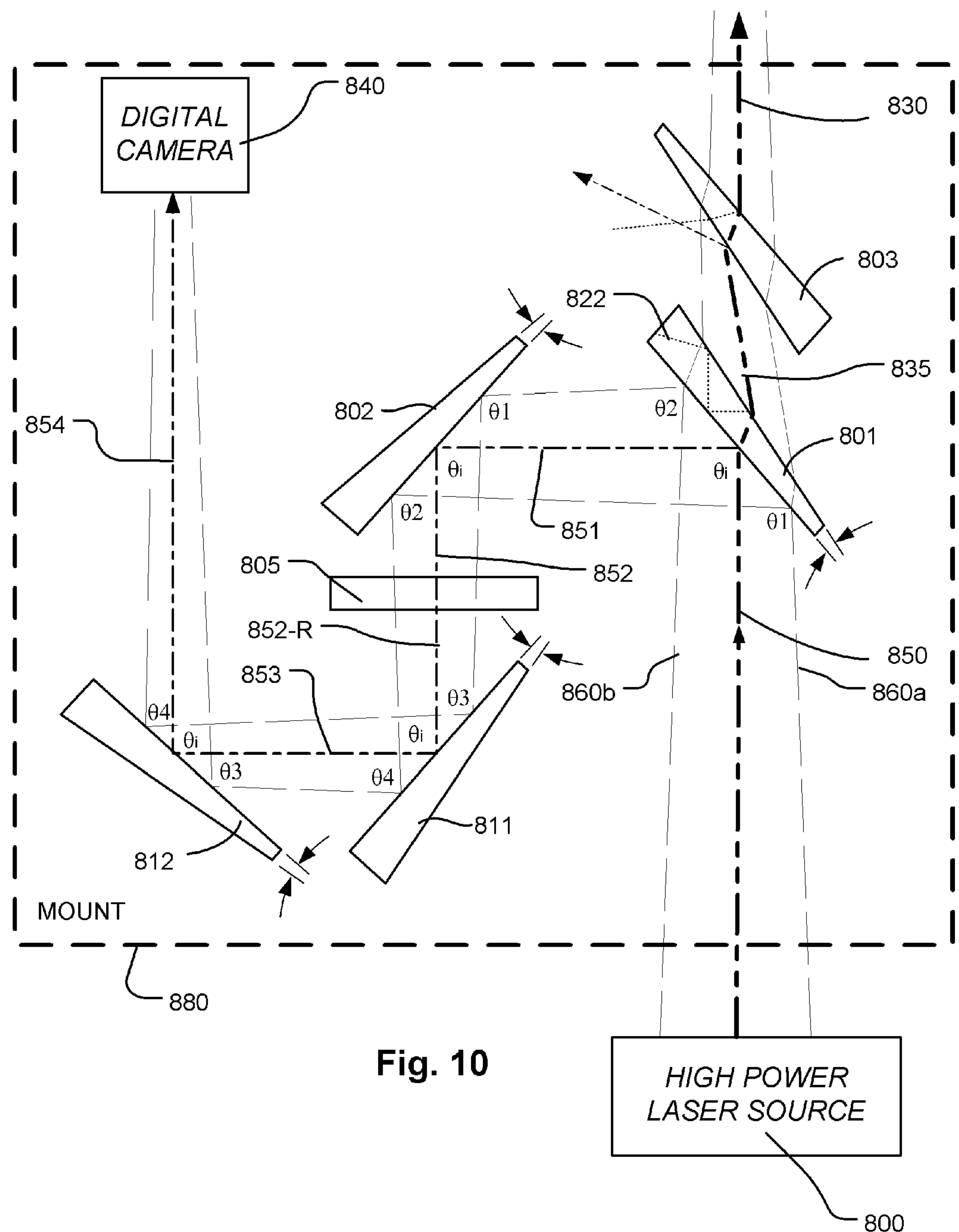
FIG. 10 illustrates an alternative polarization compensated beam sampler and image sensor which can be used for sampling and imaging high power, converging or diverging beams.

FIG. 10 is a diagram of an embodiment of a beam sampling system that is insensitive to polarization errors and compensates for non-parallel rays in a laser beam provided by a source 800. In the configuration of FIG. 10, two polarization sensitive beam splitters, embodied by respective pairs of uncoated optical plates or wedges (801, 802) and (811, 812) are arranged with a 90 degree rotator 805 placed in between. The wedge pairs (801, 802) and (811, 812) are arranged to correct for non-parallel rays. As a result, the split-off output sample beam on path 854 becomes insensitive to polarization errors and preserves the transverse spatial profile of the input beam by compensating for variations in incident angles for the non-parallel rays. The pairs of wedges (801, 802) and (811, 812), and the rotator are secured to a mount 880 that can be placed in a beam line of a high power laser system, in a location, such as between the output mirror M80 of the DGS of FIG. 5 and the target surface.

In the example shown in FIG. 10, the optical wedge 801 is placed in an input beam line of a converging high-energy laser beam having a principal axis on line 850, to where the convergence is indicated by the non-parallel beam lines 860*a*, 860*b*. The optical wedge 801 can comprise an uncoated optical wedge of fused silica or borosilicate glass, for example, in systems in which the laser energy has a wavelength in a range substantially transmitted by such material. Alternative materials, and the use of coatings, can be chosen according to the wavelength of operation and other parameters, as discussed above.

The principal axis of the laser beam on the input beam line 850 is incident on the first face of the optical wedge 801 at an external angle of incidence (½ θi). A sample of the beam is reflected off the first face of the optical wedge 801 as a first reflected beam having a principal axis on a first reflected beam line 851. The first reflected beam includes components that comprise respective percentages of the two orthogonal polarization states (i.e. P-polarization and S-polarization) of the laser energy from the source 800, the relative magnitudes of which depend on the input polarization of the input beam on path 420 and the external angle of incidence of the individual rays.

The second optical wedge 802 has first and second faces, and the principal axis of the first reflected beam on line 851 is incident on the first face at the same external angle of incidence (½ θi), where it is split into the first intermediate sample beam having a principal axis on line 852, and a second internally transmitted beam (not shown).

A ray in the input beam following the converging line 860*a* is incident on the first face of wedge 801 at a relatively larger angle of incidence (½ θ1) and then incident on the first face of the wedge 802 at a relatively smaller angle of incidence (½ θ2). In a complementary fashion, a ray in the input beam following the converging line 860*b* is incident on the first face of wedge 801 at the relatively smaller angle of incidence (½ θ2) and then incident on the first face of the wedge 802 at the relatively larger angle of incidence (½ θ1). The sum of the incidence angles on the first and second wedges 801, 802 for any ray in the input beam is therefore constant. Therefore, over a range of incident angles within which the change in reflectivity of the wedges with incident angles is relatively flat, a complementary arrangement of the first and second wedges 801, 802 compensates for variations in incident angle for the rays in converging or otherwise non-collimated beams.

A rotator 805, such as a quartz rotator, rotates the polarization of both components of the sample on line 852 by a constant angle (90 degrees in this case), regardless of the polarization state of the sample. The polarization rotator 805 can comprise a quartz plate having a thickness determined to cause 90 degrees of rotation, for example, at the wavelength of interest, in systems in which the laser energy is in a range substantially transmitted by such material. Alternative rotator technologies and rotator plate materials can be chosen according to the wavelength of operation and other parameters as discussed above.

After rotation, a rotated intermediate sample beam having a principal axis on line 852-R is directed to the second beam splitter, that comprises the wedge pair (811, 812). The principal axis on line 852-R is incident on the first face of the third wedge 811 at the same external angle of incidence (½ θi), and is reflected as a second reflected beam having a principal axis on second reflected beam line 853. The principal axis of the second reflected beam on line 853 is incident on the first face of the fourth optical wedge 812 at the same external angle of incidence (½ θi), where it is reflected as the output sample beam having a principal axis on beam line 854.

The wedge pair (811, 812) is arranged so that a ray in the rotated intermediate sample beam having a principal axis on line 852-R following the converging line 860*a* is incident on the first face of wedge 811 at a relatively smaller angle of incidence (½ θ4) and then incident on the first face of the wedge 812 at a relatively larger angle of incidence (½ θ3). In a complementary fashion, a ray in the input beam following the converging line 860*b* is incident on the first face of wedge 811 at the relatively larger angle of incidence (½ θ3) and then incident on the first face of the wedge 802 at the relatively smaller angle of incidence (½ θ4). The sum of the incidence angles on the first and second wedges (811, 812) for any ray in the input beam is therefore constant. Therefore, over a range of incident angles within which the change in reflectivity of the wedges with incident angles is relatively flat, a complementary arrangement of the third and fourth wedges (811, 812) compensates for variations in incident angle for the rays in converging or otherwise the non-collimated beams.

The beam splitter optical wedges 811, 812 can be the same as the optical wedges 801, 802, comprising an uncoated optical wedge of fused silica or borosilicate glass, for example, in systems in which the laser energy has a wavelength in a range substantially transmitted by such material. Alternative materials can be chosen according to the wavelength of operation and other parameters, as discussed above.

The four beam splitter optical wedges (801, 802) and (811, 812) are arranged to have matching incident angles on the principal axes of the beams (e.g. 45 degrees) when they comprise matching materials. However, this design will work over a range of angles of incidence.

The polarization rotation and matched sums of incident angles cause the reflectivity of the surfaces of the two beam splitters that comprise respective pairs (801, 802) and (811, 812) of optical wedges, to be the product of the reflectivity of two orthogonal polarization states, which is constant for a given incident angle, where the variations in angle of incidence caused by non-parallel rays in the converging beam are largely canceled. Depolarization errors and convergence of the laser energy on input beam line 850 will now have little effect on the percentage of the main beam's energy delivered on output beam line 854, resulting in a polarization-compensated and convergence compensated, diagnostic beam.

As with the embodiment of FIG. 3, a beam splitter optical wedge, like the optical wedge 801 in FIG. 10, causes strong re-pointing of the transmitted beam, offset of the beam, and reshaping, because one dimension of the beam is reduced (re-pointing by 7.5 degrees and width reduction of 23% for the illustrated case). However, this effect can be completely or substantially eliminated as shown in FIG. 10, by placing a compensating beam splitter optical wedge 803 in the deflected beam line 435, reversed in direction from the first. The laser energy on path 835 is refracted by the optical wedge 803 and exits so that the output beam has a principal axis on output beam line 830. This restores the original pointing direction so that the principal axis of the input beam on line 850 and the principal axis of the output beam on line 830 are parallel. Also, by placing splitter optical wedge 803 at the correct distance from the first beam splitter optical wedge 801, the beam offset can be canceled, and as result beam lines 850 and 830 are aligned. The beam splitter optical wedge 803 can be the same as the optical wedge 801, comprising an uncoated optical wedge of fused silica or borosilicate glass, for example, in systems in which the laser energy is in a range substantially transmitted by such material. Alternative materials can be chosen according to the wavelength of operation and other parameters. In some embodiments, the second optical wedge 803 can comprise a different material than the first optical wedge 801, with appropriate adjustments in arrangement of the components that may arise because of differences in the index of refraction, or other optical properties.

Also, as in the configuration shown in FIG. 3, to suppress the unwanted rear surface beam splitter reflections (referred to as ghosts), a large enough optical wedge angle is used in the embodiments described here, such that the beams on internally reflected beam line 822 reflected from the second surface of the beam splitter optical wedge 801 are trapped inside the optical element by total internal reflection. This requires that the internal optical incidence angle be greater than or equal to the critical angle for total internal reflection, which for a fused silica substrate and a laser wavelength of 1053 nanometers, is 43.6 degrees. As shown in FIG. 10, for a 43 to 47 degree angle of incidence on the external surface, this is readily achieved with a beam splitter optical wedge angle of 7.5 degrees.

Figure 11:
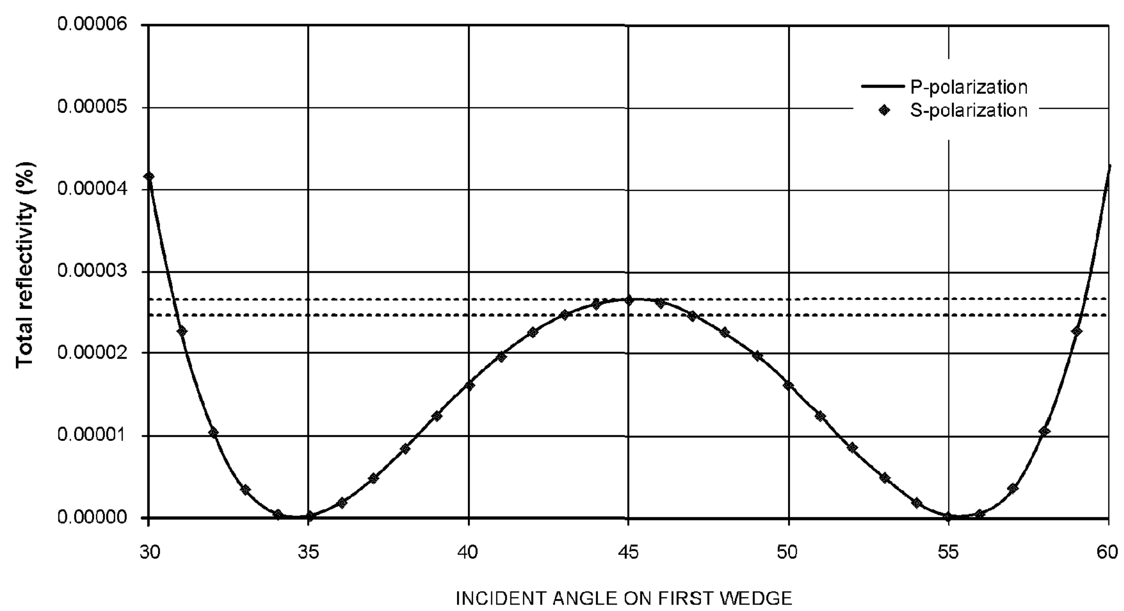
FIG. 11 is a graph total reflectivity of the sampler embodiment of FIG. 10 versus incidence angle.

FIG. 11 is a graph showing the total beam sampling reflectivity versus input angle for a sampling system like that of FIG. 10, in which each beam splitter comprises a complementary pair of optical wedges. The graph shows that the percentage of primary and secondary polarization components of the input beam is constant, independent of incident angle. Also, the graph shows that over a range of plus or minus 2° (corresponding with a f/15 converging beam) around a chosen primary incident angle (45° in this example) the variation in total reflectivity can be quite small, and even negligible for the purposes of sensing some characteristics of the input beam. In the illustrated example, the variation in sampling ratio versus input angle is reduced from over 40% as shown in FIG. 8, to about 6.7% as illustrated in FIG. 11 in the range of plus or minus 2° around a 45° incident angle.

An added benefit of arrangements like that shown in FIG. 10 is the amount of optical attenuation achieved. The attenuation achieved for the example illustrated in the graph of FIG. 11 is the equivalent of a neutral density ND of 6.6, with total reflectivity on the order of $2.6\times10^{-5}$%. Using uncoated optical wedges for at least the input splitter, a very high power input beam can be sampled in a manner that produces an output sample beam with a high fidelity preservation of the spatial profile of the input beam with low energy, suitable for delivering to delicate sensors such as digital cameras and the like.

The embodiment shown in FIG. 10 includes a digital camera 840 positioned in the beam line 854 to receive the sample output beam, and produce an image that matches the transverse spatial profile of the beam at a plane equivalent to the surface of the target.

A characteristic is "substantially preserved," or an angle or other property is "substantially" equal to another in the context of the present technology, when the results achieved by the embodiments implemented meet performance specifications and fall within manufacturing tolerances for the components and systems being deployed.

While the present invention is disclosed by reference to the preferred embodiments and examples detailed above, it is to be understood that these examples are intended in an illustrative rather than in a limiting sense. It is contemplated that modifications and combinations will readily occur to those skilled in the art, which modifications and combinations will be within the spirit of the invention and the scope of the following claims.

What is claimed is:

1. A beam sampling system, comprising:

a first beam splitter adapted to split a laser beam propagating on a beam line with a principal axis, and having a primary polarization component and a secondary polarization component, into an intermediate sample beam on an intermediate sample beam line, and a first beam splitter output beam, such that the intermediate sample beam includes a first percentage of the primary polarization component of the laser beam and a second percentage of the secondary polarization component of the laser beam;

means for rotating polarization of the intermediate sample beam; and a second beam splitter matching the first beam splitter, and mounted in relation to the first beam splitter, so that the intermediate sample beam is split and provides an output sample beam on an output sample beam line, the output sample beam including substantially said first percentage of the secondary polarization component of the intermediate sample beam and substantially said second percentage of the primary polarization component of the intermediate sample beam.

2. The sampling system of claim 1, wherein the means for rotating polarization of the intermediate sample beam includes a 90-degree polarization rotator positioned in the intermediate sample beam line.

3. The sampling system of claim 1, wherein the means for rotating polarization of the intermediate sample beam comprises an arrangement of the first and second beam splitters so that a 90-degree polarization rotation occurs on reflection from a surface of one of the first and second the beam splitters.

4. The sampling system of claim 1, wherein:

the first beam splitter includes means for compensating for variations due to non-parallel rays in the laser beam; and the second beam splitter includes means for compensating for variations due to non-parallel rays in the intermediate sample beam.

5. The sampling system of claim 1, wherein:

the first beam splitter comprises a first optical wedge, having first and second faces, its second face inclined relative to its first face by a wedge angle, and arranged so that the principal axis of the beam line intersects the first face at an external angle of incidence, and is split into the first intermediate sample beam and a first internally transmitted beam, and wherein the first internally transmitted beam intersects the second face of the first optical wedge at an internal angle of incidence and is split into an internally reflected beam and the first beam splitter output beam; and the second beam splitter comprises a second optical wedge, having first and second faces, and wherein a principal axis of the intermediate sample beam intersects the first face at said external angle of incidence, and is split into the output sample beam and a second internally transmitted beam.

6. The sampling system of claim 5, wherein the said wedge angle has a value such that the internally reflected component reflected from the second face of the first optical wedge internally intersects the first face of the first optical wedge at an angle of incidence greater than or equal to an angle of total internal reflection for the first optical wedge.

7. The sampling system of claim 5, wherein the first optical wedge comprises an uncoated optical wedge of fused silica or borosilicate glass.

8. The sampling system of claim 5, wherein the first and second optical wedges comprise respective uncoated elements of fused silica or borosilicate glass.

9. The sampling system of claim 5, including a third optical wedge having first and second faces, its second face is inclined relative to its first face by substantially said wedge angle, and mounted in relation to the first optical wedge so that the first beam splitter output component is externally incident on its first face, and its first face is substantially parallel to the second face of the first optical wedge, and its second face is substantially parallel to the first face of the first optical wedge.

10. The sampling system of claim 9, wherein the first face of the third optical wedge is spaced away from the second face of the first optical wedge by a distance so that the first beam splitter output beam from the first optical wedge traverses the third optical wedge and emerges from its second face on an output beam line having a principal axis substantially aligned with the principal axis of the laser beam incident on the first optical wedge.

11. The sampling system of claim 1, wherein the first beam splitter comprises a first optical wedge, having first and second faces, its second face inclined relative to its first face by a wedge angle, and arranged so that the principal axis of the beam line intersects the first face at an external angle of incidence, and is split into a first reflected beam and a first internally transmitted beam, and wherein the first internally transmitted beam intersects the second face of the first optical wedge at an internal angle of incidence and is split into an internally reflected beam and the first beam splitter output beam; and a second optical wedge, having first and second faces, wherein a principal axis of the first reflected beam intersects the first face at said external angle of incidence, and is split into the first intermediate sample beam and a second internally transmitted beam.

12. The sampling system of claim 11, wherein the said wedge angle has a value such that the internally reflected beam reflected from the second face of the first optical wedge internally intersects the first face of the first optical wedge at an angle of incidence greater than or equal to an angle of total internal reflection for the first optical wedge.

13. The sampling system of claim 11, wherein the first and second optical wedges comprise respective uncoated elements of fused silica or borosilicate glass.

14. The sampling system of claim 11, including a third optical wedge having first and second faces, its second face is inclined relative to its first face by substantially said wedge angle, and mounted in relation to the first optical wedge so that the first beam splitter output beam is externally incident on its first face, and its first face is substantially parallel to the second face of the first optical wedge, and its second face is substantially parallel to the first face of the first optical wedge.

15. The sampling system of claim 14, wherein the first face of the third optical wedge is spaced away from the second face of the first optical wedge by a distance so that the first beam splitter output beam from the first optical wedge traverses the third optical wedge and emerges from its second face on an output beam line having a principal axis substantially aligned with the principal axis of the laser beam incident on the first optical wedge.

16. The sampling system of claim 11, wherein the second beam splitter comprises a third optical wedge, having first and second faces, and wherein a principal axis of the intermediate sample beam intersects the first face at said external angle of incidence, and is split into a second reflected beam and an internally transmitted beam; and a fourth optical wedge, having first and second faces, wherein a principal axis of the second reflected beam intersects the first face at said external angle of incidence, and is split into the output sample beam and an internally transmitted beam.

17. The sampling system of claim 1, wherein the first beam splitter output beam propagates on a beam line having an offset angle and displacement, and is reshaped relative to the laser beam incident on the first beam splitter; and including means for correcting for the offset angle, displacement, and beam reshaping induced by the first beam splitter.

18. The sampling system of claim 1, including a sensor mounted in the output sample beam line.

19. The sampling system of claim 18, wherein the sensor comprises an energy meter.

20. The sampling system of claim 18, wherein the sensor comprises an image sensor.

21. A method for sampling a laser beam propagating on a beam line with a principal axis, and having a primary polarization component and a secondary polarization component, comprising:

splitting the laser beam, using a first beam splitter, into a first intermediate sample beam on an intermediate sample beam line and a first beam splitter output beam, the intermediate sample beam including a first percentage of the primary polarization component of the laser beam and a second percentage of the secondary polarization component of the laser beam;

rotating polarization of the intermediate sample beam; and splitting the intermediate sample beam, using a second beam splitter matching the first beam splitter, to provide an output sample beam on an output sample beam line, the output sample beam including substantially said first percentage of the secondary polarization component of the intermediate sample beam and substantially said second percentage of the primary polarization component of the intermediate sample beam.

22. The method of claim 21, including:

compensating for variations due to non-parallel rays in the laser beam; and compensating for variations due to non-parallel rays in the intermediate sample beam.

23. The method of claim 21, the first beam splitter including an optical wedge having a wedge angle so that a portion of the laser beam that is internally reflected back to an input face of the optical wedge, intersects the input face at an angle of incidence greater than or equal to an angle of total internal reflection.

24. The method of claim 21, wherein the first beam splitter output beam propagates on a beam line having an offset angle and displacement, and is reshaped relative to the laser beam; and including:

correcting for the offset angle, and displacement, and for the beam reshaping.

25. The method of claim 21, including sensing a characteristic of the output sample beam.

26. The method of claim 25, wherein the characteristic is energy.

27. The method of claim 25, wherein the characteristic is a transverse spatial profile of the output sample beam.

28. A beam sampling system, comprising:

a first beam splitter adapted to split a laser beam propagating on a beam line with a principal axis, and having a primary polarization component and a secondary polarization component, into an intermediate sample beam on an intermediate sample beam line, and a first beam splitter output beam, such that the intermediate sample beam includes a first percentage of the primary polarization component of the laser beam and a second percentage of the secondary polarization component of the laser beam; and a second beam splitter matching the first beam splitter and mounted in relation to the first beam splitter, so that the intermediate sample beam is split to provide an output sample beam on an output sample beam line, the output sample beam including substantially said first percentage of the secondary polarization component of the intermediate sample beam and substantially said second percentage of the primary polarization component of the intermediate sample beam; and wherein one of the first and second beam splitters is arranged to cause rotation of the polarization of the corresponding one of the intermediate sample beam and the output sample beam, relative to the laser beam on the beam line.

29. A beam sampling system, comprising:

a first beam splitter adapted to split a laser beam propagating on a beam line with a principal axis, and having a primary polarization component and a secondary polarization component, into an intermediate sample beam on an intermediate sample beam line, and a first beam splitter output beam, such that the intermediate sample beam includes a first percentage of the primary polarization component of the laser beam and a second percentage of the secondary polarization component of the laser beam;

a 90-degree polarization rotator positioned in the intermediate sample beam line; and a second beam splitter matching the first beam splitter and mounted in relation to the first beam splitter, so that the intermediate sample beam is split to provide an output sample beam on an output sample beam line, the output sample beam including substantially said first percentage of the secondary polarization component of the intermediate sample beam and substantially said second percentage of the primary polarization component of the intermediate sample beam.

30. A sampling system for sampling a laser beam propagating on a beam line with a principal axis, and having a primary polarization component and a secondary polarization component, comprising:

first means for splitting the laser beam into a first intermediate sample beam on an intermediate sample beam line and a first split output beam, the intermediate sample beam including first percentage of the primary polarization component of the laser beam and a second percentage of the secondary polarization component of the laser beam;

means for rotating polarization of the intermediate sample beam; and second means for splitting the intermediate sample beam to provide an output sample beam on an output sample beam line, wherein the second means matches the first means so that the output sample beam including substantially said first percentage of the secondary polarization component of the intermediate sample beam and substantially said second percentage of the primary polarization component of the intermediate sample beam.

31. The sampling system of claim 30, including:

means for compensating for variations due to non-parallel rays in the laser beam; and means for compensating for variations due to non-parallel rays in the intermediate sample beam.

32. The sampling system of claim 30, including the first means for splitting includes an optical wedge having a wedge angle so that a portion of the laser beam that is internally reflected back to an input face of the optical wedge, intersects the input face at an angle of incidence greater than or equal to an angle of total internal reflection.

33. The sampling system of claim 30, wherein the first beam splitter output beam propagates on a beam line having an offset angle and displacement, and is reshaped relative to the laser beam; and including:

means for correcting for the offset angle, and displacement, and for the beam reshaping.

34. The sampling system of claim 30, including means for sensing a characteristic of the output sample beam.

* * * * *